United States Patent [19]
Itoi et al.

[11] Patent Number: 5,519,682
[45] Date of Patent: May 21, 1996

[54] METHOD OF AND APPARATUS FOR RECORDING DIGITAL DATA ON AN OPTICAL DISK WITH TWO OPTICAL HEADS

[75] Inventors: Satoshi Itoi; Shigeru Araki, both of Tokyo, Japan

[73] Assignee: NEC Corporation, Japan

[21] Appl. No.: 276,333

[22] Filed: Jul. 15, 1994

[30] Foreign Application Priority Data

Jul. 19, 1993 [JP] Japan .................................... 5-177133

[51] Int. Cl.$^6$ .................................................. G11B 7/00
[52] U.S. Cl. .............................. 369/54; 369/47; 369/49; 369/50; 369/13; 369/124; 369/44.14
[58] Field of Search ................................ 369/54, 58, 53, 369/47, 48, 49, 50, 59, 112, 124, 13, 32, 44.14, 44.37, 93

[56] References Cited

U.S. PATENT DOCUMENTS

| | | | |
|---|---|---|---|
| 4,387,452 | 6/1983 | Bricot et al. | 369/44.14 X |
| 4,807,204 | 2/1989 | Mizutani et al. | 369/13 |
| 4,873,679 | 10/1989 | Murai et al. | 369/93 X |
| 5,253,242 | 10/1993 | Satoh et al. | 369/44.37 X |
| 5,418,774 | 5/1995 | O'Hara et al. | 369/111 X |

FOREIGN PATENT DOCUMENTS 63-161532  7/1988  Japan .

*Primary Examiner*—Georgia Y. Epps
*Assistant Examiner*—Muhammad N. Edun
*Attorney, Agent, or Firm*—Ostrolenk, Faber, Gerb & Soffen

[57] ABSTRACT

An optical disk recordable on first and second principal surfaces thereof rotates at a constant angular velocity. First and second optical heads positioned over the respective first and second principal surfaces are simultaneously moved along the same or different radiuses by a disk rotating unit for recording data on the optical disk. A head position detector is responsive to track addresses read by the first and second optical heads for outputting head position signals indicative of the distances from the center of the optical disk to the first and second optical heads. A control clock generator determines the ratio of linear velocities of tracks where the first and second optical heads are positioned, and generates control clock signals having respective bit rates depending on the linear velocity ratio. Based on the control clock signals, a data distributor distributes image data and non-image data such as audio and control data to the first and second optical heads.

11 Claims, 2 Drawing Sheets

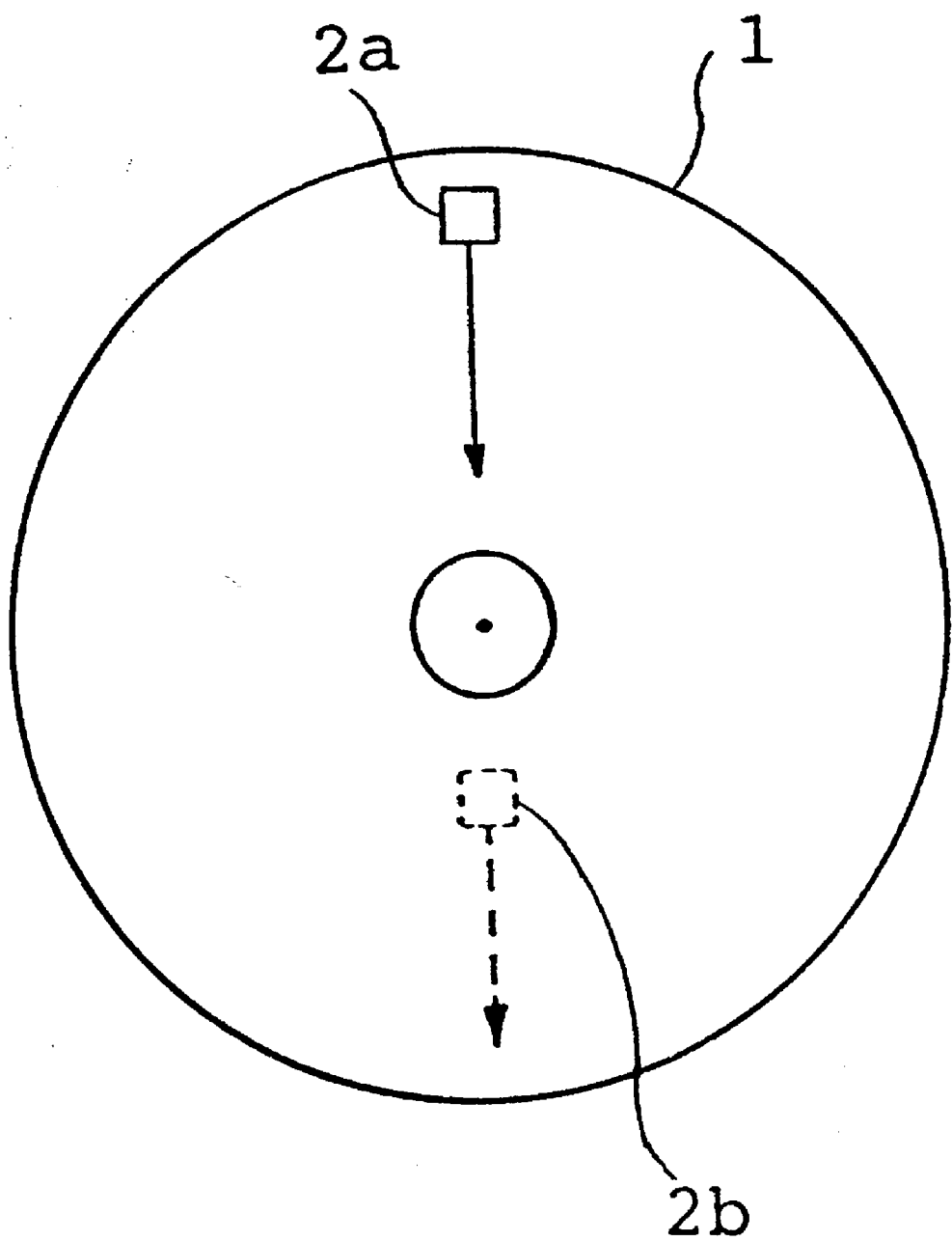

METHOD OF AND APPARATUS FOR RECORDING DIGITAL DATA ON AN OPTICAL DISK WITH TWO OPTICAL HEADS

BACKGROUND OF THE INVENTION

1. Field of the Invention

The present invention relates to an optical disk system, and more particularly to a method of and an apparatus for recording digital image data or other digital non-image data on an optical disk including a magneto-optical disk based on the CWL-CAV (Constant WaveLength-Constant Angular Velocity) principles.

2. Description of the Related Art

Heretofore, it has been customary to record digital data or image and audio data on an optical disk progressively in a radially outward direction. For example, such data are recorded on either one surface of a compact disk (CD) which is 12 cm across or both surfaces of a laser disk which is 30 cm across.

Digital image or non-image data may be recorded on an optical disk according to the CAV (Constant Angular Velocity) process in which the optical disk rotates at a constant rotational speed, the CLV (Constant Linear Velocity) process in which the linear velocity of tracks is constant, or the CWL (Constant WaveLength)-CAV process in which the rotational speed of the optical disk is constant and the recording clock frequency is varied depending on the position of the optical head to record the data at a constant wavelength.

The CAV mode is advantageous because it allows an easy high-speed search process and simple rotational control process, but disadvantageous in that the recording density at radially outer regions of tracks is lowered, making itself inappropriate for high-density data recording. While it is possible to record data at a high density in the CLV mode as the recording density can be constant in all regions of the tracks, the CLV mode results in a time-consuming search process because it is difficult to instantaneously control the disk to rotate at a desired speed when seeking a certain region of the track for playback. The CWL-CAV mode solves these problems, and is capable of attaining the advantages of the CAV mode, i.e., searching for a desired region of the track at a high speed and recording data at a high density.

In the case where a conventional optical disk apparatus is to operate in the CWL-CAV mode, it is necessary to keep the rotational speed of the optical disk constant and vary the recording clock frequency depending on the optical head position for recording desired data on the optical disk. For playback, it is necessary to generate reliably and quickly a playback clock signal in synchronism with reproduced data whose period varies depending on the optical head position. To meet these requirements, the optical disk system operable in the CWL-CAV mode has a complex and expensive circuit arrangement.

SUMMARY OF THE INVENTION

It is an object of the present invention to provide a method of and an apparatus for recording data on an optical disk in the CWL-CAV mode with a simplified circuit arrangement.

To achieve the above object, there is provided in accordance with the present invention a method of recording data composed of image data and non-image data on an optical disk recordable on first and second principal surfaces thereof. The non-image data includes at least audio and control data. The method comprises the steps of rotating the optical disk at a constant angular velocity, simultaneously moving first and second optical heads over the first and second principal surfaces, respectively, radially inwardly and outwardly, respectively, of the optical disk to record data in tracks on the first and second principal surfaces, respectively, such that the sum of distances from the center of the optical disk to the first and second optical heads is constant, detecting the distances from the center of the optical disk to the first and second optical heads, determining the ratio of linear velocities of respective tracks where the first and second optical heads are positioned based on the determined distances, determining bit rates corresponding to the ratio of linear velocities, and distributing the data to the first and second optical heads depending on the bit rates.

The step of determining bit rates comprises the steps of distributing the non-image data at a constant ratio irrespective of the positions of the first and second optical heads, and distributing and adding the image data to the non-image data which are distributed at the constant ratio, thereby determining the bit rates.

According to the present invention, there is also provided an apparatus for recording data composed of image data and non-image data on an optical disk recordable on first and second principal surfaces thereof. The non-image data includes at least audio and control data. The apparatus comprises disk rotating means for rotating the optical disk at a constant angular velocity, head moving means for simultaneously moving first and second optical heads over the first and second principal surfaces, respectively, radially inwardly and outwardly, respectively, of the optical disk to record data in tracks on the first and second principal surfaces, respectively, such that the sum of distances from the center of the optical disk to the first and second optical heads is constant, head position detecting means for detecting the distances from the center of the optical disk to the first and second optical heads, bit rate determining means for determining the ratio of linear velocities of respective tracks where the first and second optical heads are positioned, based on the determined distances, and determining bit rates corresponding to the ratio of linear velocities, and data distributing means for distributing the data to the first and second optical heads depending on the bit rates.

The bit rate determining means comprises means for distributing the non-image data to the first and second optical heads at a constant ratio irrespective of the positions of the first and second optical heads, and distributing and adding the image data to the non-image data which are distributed to the first and second optical heads at the constant ratio, thereby determining the bit rates. The bit rate determining means may comprise means for determining the bit rates such that the non-image data are distributed to the first and second optical heads in equal proportions.

Preferably, the bit rate determining means comprises means for varying the ratio of linear velocities continuously or stepwise depending on the distances from the center of the optical disk to the first and second optical heads.

The optical disk has a spiral track or concentric tracks on each of the first and second principal surfaces. Preferably, the first and second optical heads are disposed along different radiuses or the same radius of the optical disk.

The optical disk can be a magneto-optical disk.

The above and other objects, features, and advantages of the present invention will become apparent from the following description referring to the accompanying drawings which illustrate an example of a preferred embodiment of the present invention.

BRIEF DESCRIPTION OF THE DRAWINGS

FIG. 2 is a view showing the manner in which two optical heads move relative to an optical disk in the optical disk apparatus shown in FIG. 1.

DETAILED DESCRIPTION OF THE PREFERRED EMBODIMENT

Figure 1:
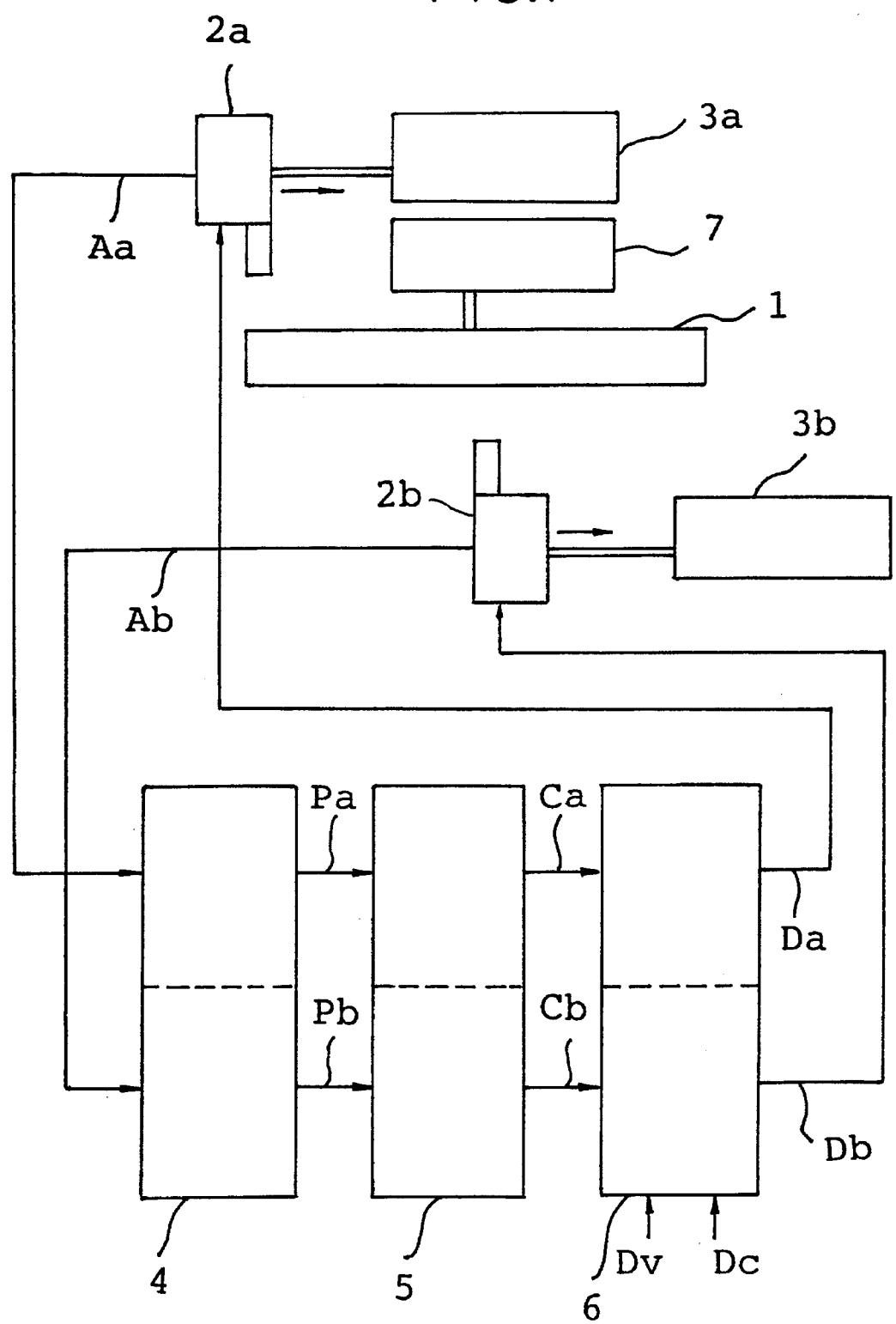
FIG. 1 is a block diagram of an optical disk apparatus according to the present invention.

As shown in FIG. 1, an optical disk apparatus has an optical disk 1 as an optical recording medium for recording data on opposite surfaces thereof, i.e., first and second principal surfaces thereof, with optical heads. The optical recording medium may comprise a magneto-optical disk. The optical disk 1 can be rotated about its own axis at a constant angular velocity by a disk rotating unit 7. The optical disk 1 has a spiral recording track or concentric recording tracks on its opposite surfaces. The optical disk apparatus also has a pair of optical heads 2a, 2b disposed along the same diameter over the respective first and second principal surfaces of the optical disk 1.

As shown in FIG. 2, optical head 2a can be moved by a head actuator 3a radially inwardly over the first principal surface of the optical disk 1 to record data thereon, and the optical head 2b can be moved by a head actuator 3b radially outwardly over the second principal surface of the optical disk 1 to record data thereon. In this case the optical heads 2a, 2b are moved along different radiuses of the optical disk 1. However, in another case, the optical heads 2a, 2b can be moved along the same radius of the optical disk 1. When the optical heads 2a, 2b are moved in respective opposite radial directions toward and away from the center of the optical disk 1 to record data thereon, the sum of the distances from the center of the optical disk 1 to the optical heads 2a, 2b is constant at all times.

The distances from the center of the optical disk 1 to the optical heads 2a, 2b, i.e., the positions of the optical heads 2a, 2b, may be detected by mechanically detecting the positions of the optical heads 2a, 2b, or by recording in advance the track addresses of respective tracks on the optical disk 1 and reading the track addresses. In this embodiment, the positions of the optical heads 2a, 2b are detected according to the latter detecting process. Specifically, a head position detector 4 is supplied with track addresses Aa, Ab which are read by the respective optical heads 2a, 2b, and outputs head position signals Pa, Pb representing the distances from the center of the optical disk 1 to the optical heads 2a, 2b, respectively.

Based on the head position signals Pa, Pb supplied from the head position detector 4, a control clock generator 5 determines the ratio of linear velocities of tracks where the optical heads 2a, 2b are positioned, and generates control clock signals Ca, Cb having bit rates depending on the linear velocity ratio. Because the rotational speed of the optical disk 1 is constant, the linear velocities of the tracks where the optical heads 2a, 2b are positioned are proportional to the respective distances from the center of the optical disk 1 to the optical heads 2a, 2b. Consequently, the linear velocity ratio can easily be determined from the head position signals Pa, Pb.

Based on the bit rates represented by the respective control clock signals Ca, Cb, a data distributor 6 distributes input data Dv, Dc as recording data Da, Db to the respective optical heads 2a, 2b.

It is assumed that the optical disk 1 includes a radially outermost region of the track having a diameter of 29 cm and a radially innermost region of the track having a diameter of 14 cm, and the input data Dv, Dc are recording data having a total bit rate of 120 Mbps, i.e., image data Dv having a bit rate of 100 Mbps and other non-image data (e.g., audio or control data) Dc having a bit rate of 20 Mbps. Bit rates for the recording data Da, Db to be transmitted to the respective optical heads 2a, 2b are determined as follows:

When the recording of data on the optical disk 1 begins, optical head 2a is positioned at the radially outermost track and optical head 2b is positioned at the radially innermost track. Therefore, the ratio of linear velocities of the tracks is 29:14. The bit rate of recording data Da transmitted to optical head 2a is calculated as $120 \times 29/(29+14)=80.93$ Mbps. The bit rate of recording data Db transmitted to optical head 2b is calculated as $120 \times 14/(29+14)=39.07$ Mbps. With respect to non-image data Dc having a bit rate of 20 Mbps, the bit rate of 20 Mbps is divided into equal bit rates (10 Mbps) to be distributed to the respective optical heads 2a, 2b. Consequently, the bit rate of image data transmitted to optical head 2a is 70.93 Mbps, and the bit rate of image data transmitted to optical head 2b is 29.07 Mbps.

Thereafter, as the optical heads 2a, 2b move, the bit rate of recording data Da transmitted to optical head 2a gradually decreases, whereas the bit rate of recording data Db transmitted to optical head 2b gradually increases. When the data are finally recorded, optical head 2a is positioned at the radially innermost track and optical head 2b is positioned at the radially outermost track. Consequently, the ratio of linear velocities of the tracks is 14:29. The bit rate of recording data Da transmitted to optical head 2a is = 39.07 Mbps. The bit rate of recording data Db transmitted to optical head 2b is =80.93 Mbps. During the period of time from the start of data recording to the end of data recording, the sum of the bit rates of the recording data Da, Db transmitted to the optical heads 2a, 2b has a constant value of 120 Mbps.

The data distributor 6 thus controls the bit rates of the recording data Da, Db transmitted to the optical heads 2a, 2b such that the sum of the bit rates of the recording data Da, Db will be constant at all times. The distribution of the recording data Da, Db to the optical heads 2a, 2b can reliably be effected by a relatively simple circuit arrangement. If non-image data Dc of recording data Da, Db are of the same bit rate irrespective of the positions of the optical heads 2a, 2b, and are distributed equally to the optical heads 2a, 2b, then non-image data Dc can be processed easily. Non-image data Dc can also be processed easily if non-image data Dc are distributed at a constant ratio, which is not of equal proportions, to the optical heads 2a, 2b.

In the above embodiment, the ratio of linear velocities of the tracks at the optical heads 2a, 2b is continuously determined to establish the bit rates of the recording data transmitted to the optical heads 2a, 2b. However, the linear velocity ratio may be varied stepwise rather than continuously.

To vary the linear velocity ratio stepwise, each of the opposite surfaces of the optical disk 1 is divided into a plurality of track regions of a constant width as measured along a radius, and corresponding linear velocities are allotted to respective track regions. For example, if the optical disk 1 has a diameter of 30 cm, each surface of the optical disk 1 is divided into 103 track regions having a constant width of 0.1344 cm with the outermost region of the track having a diameter of 28.9000 cm and the innermost region of the track having a diameter of 15.0568 cm, and a track address is recorded in advance for each of the track regions.

Distribution of recording data to the optical heads will be described with respect to an example in which one frame of video data is to be recorded in one track on each of the first and second principal surfaces of an optical disk. For example, one frame of video data comprises 2644 sync blocks including 2448 sync blocks of image data Dv and 196 sync blocks of other data Dc such as audio and control data, for example. A sync block is a series of data of 190 bytes composed of a 2-byte synchronizing signal, a 2-byte ID signal, 170 bytes of data, and a 16-byte inner error correction code.

When data recording begins, optical head 2a is positioned in a radially outermost region (28.9000–28.7656 cm), and optical head 2b is positioned in a radially innermost region (15.0568–15.1912 cm). If the ratio of linear velocities at these positions is for example 28.9000:15.0568, then two numerical values close to this linear velocity ratio are determined such that the sum of the numerical values is equal to the total number of sync blocks of recording data, i.e., 1730:914. Based on the numerical values 1730, 914, the sync blocks are distributed to the recording data Da, Db transmitted to the optical heads 2a, 2b. Specifically, the number of sync blocks distributed to recording data Da is 1730, and the number of sync blocks distributed to recording data Db is 914.

With respect to non-image data (196 sync blocks), 98 sync blocks are distributed to each of the optical heads 2a, 2b. Therefore, the number of sync blocks of image data distributed to recording data Da is 1632, and the number of sync blocks of image data distributed to optical head 2b is 816.

Thereafter, when optical head 2a moves radially inwardly by 0.1344 cm and enters an adjacent track region (28.7656–28.6312 cm), optical head 2b moves radially outwardly by 0.1344 cm and enters an adjacent track region (15.1912–15.3256 cm). Since the linear velocity ratio at this time is 28.7656:15.1912, two numerical values close to this linear velocity ratio are determined such that the sum of the numerical values is equal to the total number of sync blocks of recording data, i.e., 1722:922. In this manner, each time the optical heads 2a, 2b move by 0.1344 cm, the data distribution is varied stepwise by 8 sync blocks.

When the data are finally recorded, the ratio of linear velocities of regions where the optical heads 2a, 2b are positioned is 15.0568:28.9000, and the data are distributed at a ratio of 914:1730. The image data Da are composed of a total of 914 sync blocks, including 816 sync blocks of image data and 98 sync blocks of non-image data. The image data Db are composed of a total of 1730 sync blocks, including 1632 sync blocks of image data and 98 sync blocks of non-image data.

During the period of time from the start of data recording to the end of data recording, the sum of the sync blocks of the recording data transmitted to the optical heads 2a, 2b has a constant value of 2448, and the data distribution is varied stepwise by 8 sync blocks each time the optical heads move into adjacent track regions. The recording data can thus be distributed reliably to the optical heads 2a, 2b with a relatively simple circuit arrangement. Other data such as audio and control data can be processed easily when distributed to the optical heads in equal numbers of sync blocks or in sync blocks at a constant ratio.

With the arrangement of the present invention, as described above with reference to the illustrated embodiment, an optical disk recordable on its opposite surfaces is rotated at a constant angular velocity, and first and second optical heads positioned respectively over first and second principal surfaces of the optical disk are moved radially inward and outwardly, respectively, of the optical disk to record data on the first and second principal surfaces, respectively. The distances from the center of the optical disk to the respective optical heads are detected, and the ratio of linear velocities of tracks where the optical heads are positioned is determined. Based on the determined linear velocity ratio, bit rates are established, and input data are distributed to the optical heads according to the bit rates such that the sum of the bit rates of recording data transmitted to the optical heads will be kept constant at all times. Consequently, the recording data can be distributed reliably to the optical heads by a relatively simple arrangement.

If the recording data are composed of image data and non-image data such as audio and control data, then the non-image data can be processed easily when distributed to the optical heads in equal numbers of sync blocks or sync blocks at a constant ratio. Therefore, the optical disk apparatus which operates in the CWL-CAV mode is of a relatively simple circuit arrangement.

It is to be understood, however, that although the characteristics and advantages of the present invention have been set forth in the foregoing description, the disclosure is illustrative only, and changes may be made in the shape, size, and arrangement of the parts within the scope of the appended claims.

What is claimed is:

1. A method of recording data composed of image data and non-image data including at least audio and control data on an optical disk recordable on first and second principal surfaces thereof, comprising the steps of:

rotating the optical disk at a constant angular velocity;

simultaneously moving first and second optical heads over the first and second principal surfaces, respectively, radially inwardly and outwardly, respectively, of the optical disk to record data in tracks on said first and second principal surfaces, respectively, such that the sum of distances from the center of the optical disk to the first and second optical heads is constant;

detecting the distances from the center of the optical disk to the first and second optical heads;

determining the ratio of linear velocities of respective tracks where said first and second optical heads are positioned based on the determined distances, and determining bit rates corresponding to said ratio of linear velocities; and distributing the data to said first and second optical heads depending on said bit rates.

2. A method according to claim 1, wherein said step of determining bit rates comprises the steps of:

distributing the non-image data at a constant ratio irrespective of the positions of the first and second optical heads; and distributing and adding the image data to the non-image data which are distributed at the constant ratio, thereby determining said bit rates.

3. An apparatus for recording data composed of image data and non-image data including at least audio and control data on an optical disk recordable on first and second principal surfaces thereof, comprising:

disk rotating means for rotating the optical disk at a constant angular velocity;

head moving means for simultaneously moving first and second optical heads over the first and second principal surfaces, respectively, radially inwardly and outwardly, respectively, of the optical disk to record data in tracks on said first and second principal surfaces, respectively, such that the sum of distances from the center of the optical disk to the first and second optical heads is constant;

head position detecting means for detecting the distances from the center of the optical disk to the first and second optical heads;

bit rate determining means for determining the ratio of linear velocities of respective tracks where said first and second optical heads are positioned, based on the determined distances, and determining bit rates corresponding to said ratio of linear velocities; and data distributing means for distributing the data to said first and second optical heads depending on said bit rates.

4. An apparatus according to claim 3, wherein said bit rate determining means comprises:

means for distributing the non-image data to said first and second optical heads at a constant ratio irrespective of the positions of the first and second optical heads; and distributing and adding the image data to the non-image data which are distributed at the constant ratio to the first and second optical heads, thereby determining said bit rates.

5. An apparatus according to claim 4, wherein said bit rate determining means comprises:

means for determining the bit rates such that the non-image data are distributed to said first and second optical heads in equal proportions.

6. An apparatus according to claim 4, wherein said bit rate determining means comprises:

means for varying said ratio of linear velocities continuously depending on the distances from the center of the optical disk to the first and second optical heads.

7. An apparatus according to claim 4, wherein said bit rate determining means comprises:

means for varying said ratio of linear velocities stepwise depending on the distances from the center of the optical disk to the first and second optical heads.

8. An apparatus according to claim 3, wherein said optical disk has a spiral track or concentric tracks on each of said first and second principal surfaces.

9. An apparatus according to claim 3, wherein said first and second optical heads are disposed along different radiuses of said optical disk.

10. An apparatus according to claim 3, wherein said first and second optical heads are disposed along the same radius of said optical disk.

11. An apparatus according to claim 3, wherein said optical disk is a magneto-optical disk.

* * * * *